(12) United States Patent
Panunto

(10) Patent No.: US 9,415,425 B2
(45) Date of Patent: Aug. 16, 2016

(54) ORDER SORTING SYSTEM WITH SELECTIVE DOCUMENT INSERTION

(71) Applicant: PSI Peripheral Solutions Inc., Mississauga (CA)

(72) Inventor: John Panunto, Oakville (CA)

(73) Assignee: PSI Peripheral Solutions Inc., Mississauga (CA)

( * ) Notice: Subject to any disclaimer, the term of this patent is extended or adjusted under 35 U.S.C. 154(b) by 0 days.

(21) Appl. No.: 14/062,199

(22) Filed: Oct. 24, 2013

(65) Prior Publication Data
US 2015/0114798 A1 Apr. 30, 2015

(51) Int. Cl.
*B65G 37/00* (2006.01)
*B65G 49/00* (2006.01)
*B65G 47/46* (2006.01)
*B65G 47/34* (2006.01)
*B65G 47/50* (2006.01)
*B07C 5/34* (2006.01)
*B07C 7/04* (2006.01)

(52) U.S. Cl.
CPC ... *B07C 5/34* (2013.01); *B07C 7/04* (2013.01); *B65G 37/00* (2013.01); *B65G 49/00* (2013.01)

(58) Field of Classification Search
None
See application file for complete search history.

(56) References Cited

U.S. PATENT DOCUMENTS

| 3,579,778 A * | 5/1971 | DiPaolo, Jr. | B65G 47/482 492/60 |
| 2003/0141226 A1 * | 7/2003 | Morikawa | B07C 5/18 209/584 |

* cited by examiner

*Primary Examiner* — Kavel Singh
(74) *Attorney, Agent, or Firm* — Walker & Jocke

(57) ABSTRACT

An order sorting system for sorting and assembling a batch of purchaser orders, comprises a plurality of stationary dispensable item dispensers for dispensing dispensable items with on-demand printed literature and a dispensable items conveyor for conveying the dispensable items to a lower level of a sorting station. A tote conveyor conveys a plurality of purchased articles to the upper level of the sorting station. Stationary sorting bins are disposed along an upper level of the sorting station in alignment with the dispensable items conveyor. The purchased articles are moved onto the dispensable items conveyor, either manually or preferably the sorting bins each have a releasable bottom for dropping contents of the sorting bins onto the dispensable items conveyor.

20 Claims, 5 Drawing Sheets

ORDER SORTING SYSTEM WITH SELECTIVE DOCUMENT INSERTION

FIELD OF THE INVENTION

This invention relates to order fulfilment systems. In particular, this invention relates to a system for filling an order comprising a plurality of discrete articles along with documentation that can be custom-selected for the purchaser.

BACKGROUND OF THE INVENTION

Organizations that fulfil orders for goods or articles to be delivered to purchasers, such as distribution warehouses and E-commerce and catalogue retailers, generally rely to a significant degree on manually intensive processes, or partially automated processes, to fulfil the orders. A typical order fulfilment workflow in such an organization involves receiving an on-line order from a customer, picking the purchased articles from an inventory of articles, sorting the purchased articles into containers on an order-by-order basis, assembling literature or other dispensable products to accompany the purchased articles, and physically associating the dispensable products with the purchased articles for packaging and delivery to the purchaser.

In a typical e-commerce situation, for example where product is ordered over the Internet, and if multiple items are ordered by the customer, the retailer will attempt to ship all items at one time. Taking an apparel retailer as an example, each order is picked at a distribution centre along with orders for thousands of purchasers for subsequent sorting. If 100 purchasers order the same article, all get picked and put in a bin. A person then inducts each item onto a sorter which travels around the distribution centre and separates the articles by purchaser order. This process is automated, however at each sort location the system will collect several orders of multiple items.

In addition to any documents created for internal purposes, literature or other dispensable items may be delivered to the purchaser with the articles purchased. Such literature may include (by way of example and without limitation) specification sheets, warranty information, product promotions or coupons relating to products or services and on-demand packing slip, MSDS sheets and other on demand documents. Other dispensable items may include (by way of example and without limitation) CDs, promotional gifts, product samples and the like, and any combination thereof.

U.S. Pat. No. 7,184,178 issued Feb. 27, 2007 to Panunto et al., which is incorporated herein by reference, teaches a product and document fulfilment system that fully or partially automates a order fulfilment merging a discrete purchased article with documents specific to that article, for subsequent packaging and labelling. This system works well for filling orders consisting of a single article. However, filling multiple orders that involve multiple articles presents additional challenges.

One challenge is the manner in which literature or other dispensable items, which may be specific to the articles purchased, or specific to the purchaser based on the types of articles purchased or other information previously acquired about the purchaser, are merged with the purchased articles before packing or bagging the order for delivery. This is conventionally a manual process. However, organizations that fulfill orders for purchased articles are heavily reliant on throughput in order to be competitive and profitable. As with any retail operation or organization which packages and ships different products to a large number of purchasers, a highly reliable order fulfilment system is of paramount importance. However, it is also of great importance that order fulfilment be provided at a reasonable cost so as to permit the delivery of the products to the ultimate purchasers at a reasonable price.

Another challenge is the sorting of the bins which contain several orders of multiple items per order and coordinating the collateral literature that is also selective by order based on demographic requirements of the e-tailer. Sorting each order, printing on demand documents and collecting other respective literature is a very time consuming manual process in a conventional distribution centre.

It would accordingly be advantageous to automate the merging of purchased articles with dispensable items, such as product literature or others, in batches.

BRIEF DESCRIPTION OF THE DRAWINGS

In drawings which illustrate by way of example only a preferred embodiment of the invention.

DETAILED DESCRIPTION OF THE INVENTION

The invention is a system for sorting and combining multiple articles ordered from a catalogue, online or other order-based retailer with literature or other dispensable items specific to the order being fulfilled. The system of the invention automates the merging of purchased articles with dispensable items, such as literature or other items, in batches. This generates a higher throughput, and results in shorter turnaround times for order fulfilment.

The present invention thus provides an order sorting system for sorting and assembling a batch of purchaser orders, comprising a plurality of stationary dispensable item dispensers for dispensing dispensable items, at least one dispensable items conveyor for conveying the dispensable items to a lower level of a sorting station, a plurality of stationary sorting bins disposed along an upper level of the sorting station in line with the dispensable items conveyor, a tote conveyor for conveying a plurality of purchased articles to the upper level of the sorting station, a scanner for identifying purchased articles and associating each purchased article with its respective purchaser order, and a controller for identifying into which sorting bin to place each purchased article to fill each respective order, and positioning the dispensable items associated with each respective order on the dispensable items conveyor in generally vertical alignment with the sorting bin associated with each said order, whereby the purchased articles are moved onto the dispensable items conveyor in physical proximity of any dispensable items associated with each order for packaging the purchased articles and the dispensable items together to deliver to each respective purchaser.

The present invention further provides a method of sorting and assembling a batch of purchaser orders, comprising the steps of: a. conveying a plurality of purchased articles to the sorting station, b. identifying purchased articles conveyed to the sorting station, c. in any order, i. A) dispensing dispensable items into assigned compartments of a dispensable items conveyor and B) conveying the dispensable items to a lower level of a sorting station comprising a plurality of sorting bins, ii. positioning the dispensable items associated with each respective order on the dispensable items conveyor in generally vertical alignment with the sorting bin associated with each said order, and iii. A) associating each purchased article with its respective purchaser order, B) identifying into which of a plurality of stationary sorting bins disposed along an upper level of the sorting station in line with the dispensable items conveyor to place each purchased article to fill each respective order, and C) depositing each purchased article into its respective sorting bin, and g. moving the purchased articles onto the dispensable items conveyor in physical proximity of any dispensable items associated with each order.

Figure 1:
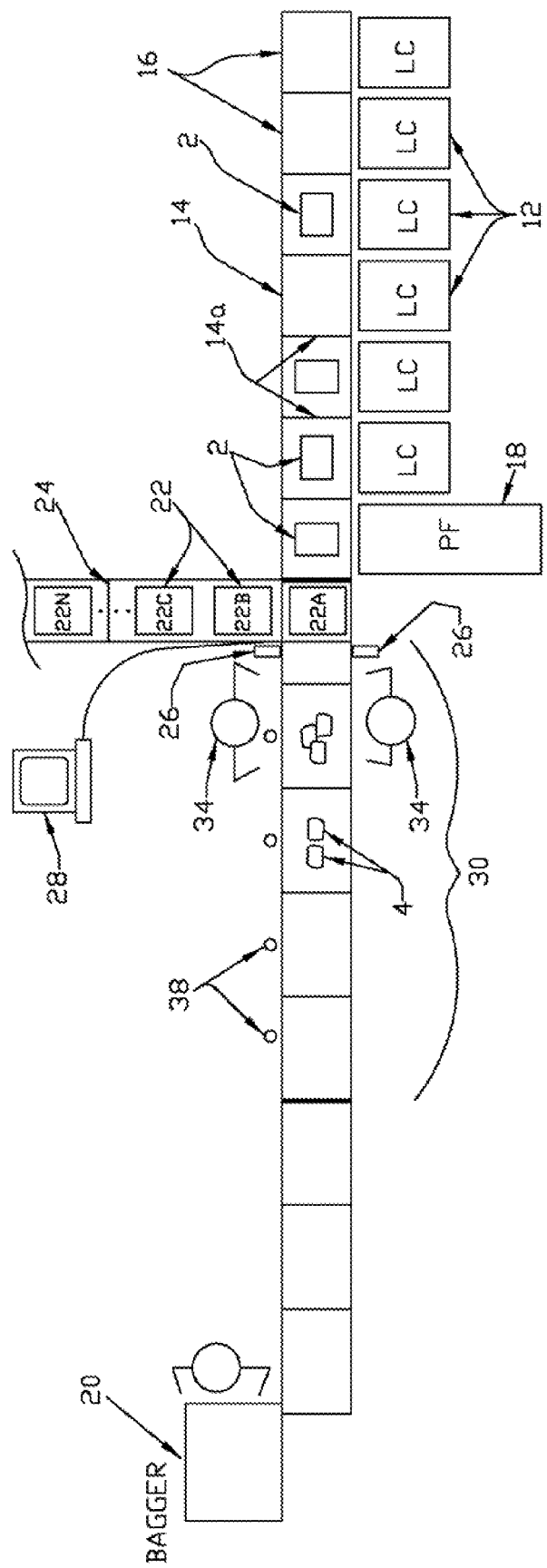
FIG. 1 is a schematic plan view of a first embodiment of an order fulfilment system according to the invention.
Figure 2:
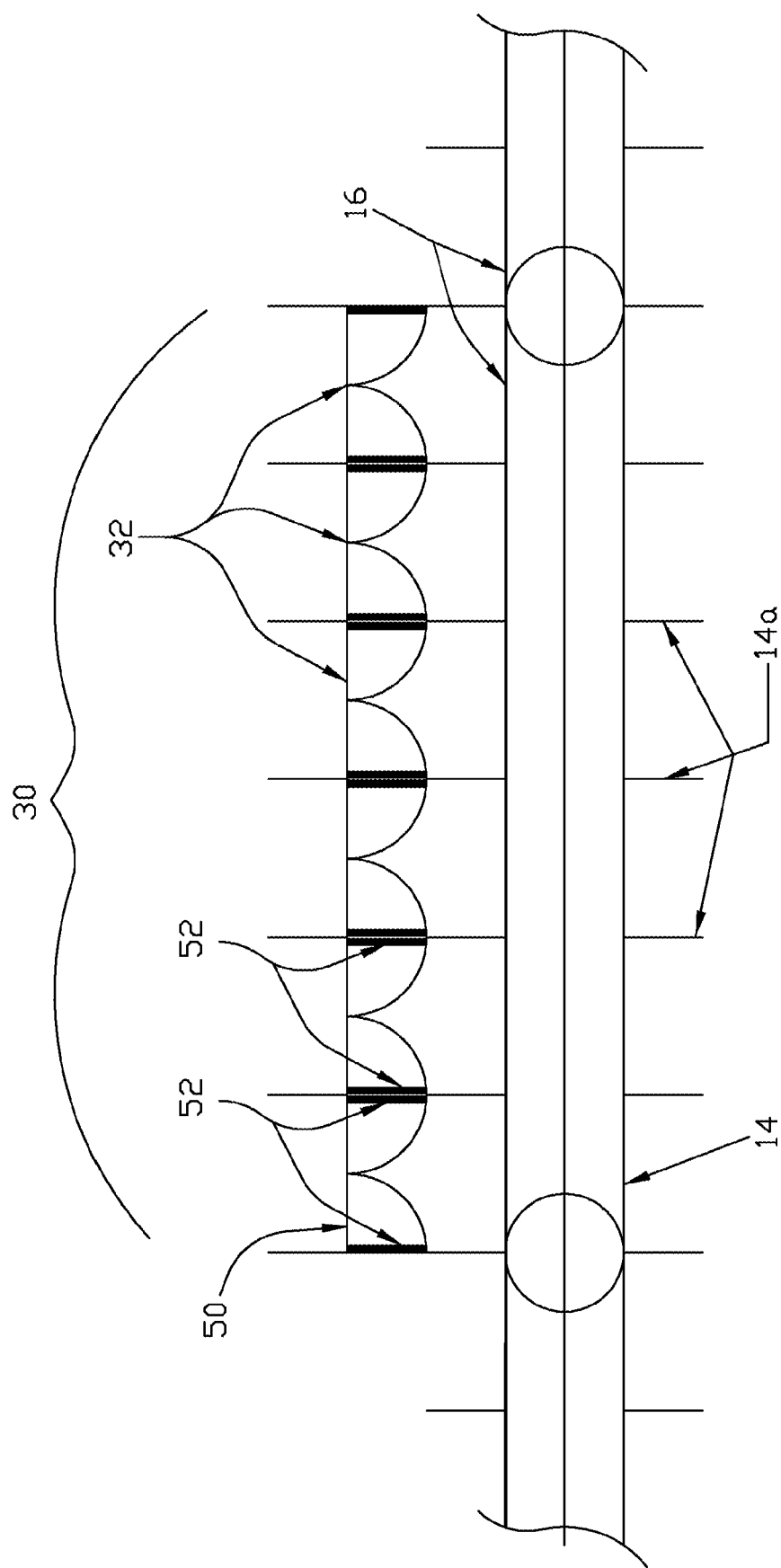
FIG. 2 is a partial schematic elevation of the embodiment of FIG. 1.

A first embodiment of an order sorting system 10 according to the invention for sorting and assembling a batch of purchaser orders is illustrated in FIGS. 1 and 2. This embodiment provides a single line of dispensable item dispensers 12 and a single tote conveyor 22 feeding into a single sorting station 30, utilizing the concepts of the invention. However, as will be seen from the further embodiments described below, the system of the invention is readily scalable to increase throughput significantly.

In the description that follows literature (such as promotional or other informational literature), coupons, and other paper-based items are referenced as "dispensable items" by way of example only. In these embodiments the dispensable item dispensers 12 may be conventional sheet dispensers, or printers that print selected literature on demand such as print feeder 18. However, dispensable items can be anything which can be dispensed by a machine, and may for example (without limitation) include items such as CDs or other media, product samples, accessories for use with purchased articles, or any other item accompanying the order when delivered to the purchaser. In the preferred embodiment the dispensable items may be (but are not necessarily) related to the articles purchased and/or related to the purchaser. In the case of a purchased article of clothing for example, dispensable items may include literature relating to care of the clothing, literature promoting similar articles, a package of laundry detergent, decals for application to the clothing fabric, etc.

The dispensable items that will accompany each order may also or alternatively be selected based on purchaser preferences, for example as determined from one or more of the articles purchased in the order being fulfilled, or as determined from previous purchases or from data acquired from other sources. For example, the direct customer such as a catalogue or online retailer may maintain information previously acquired about the ultimate purchaser, which is provided to the administrator of the sorting system 10 to assist in the selection of relevant dispensable items.

Figure 3:
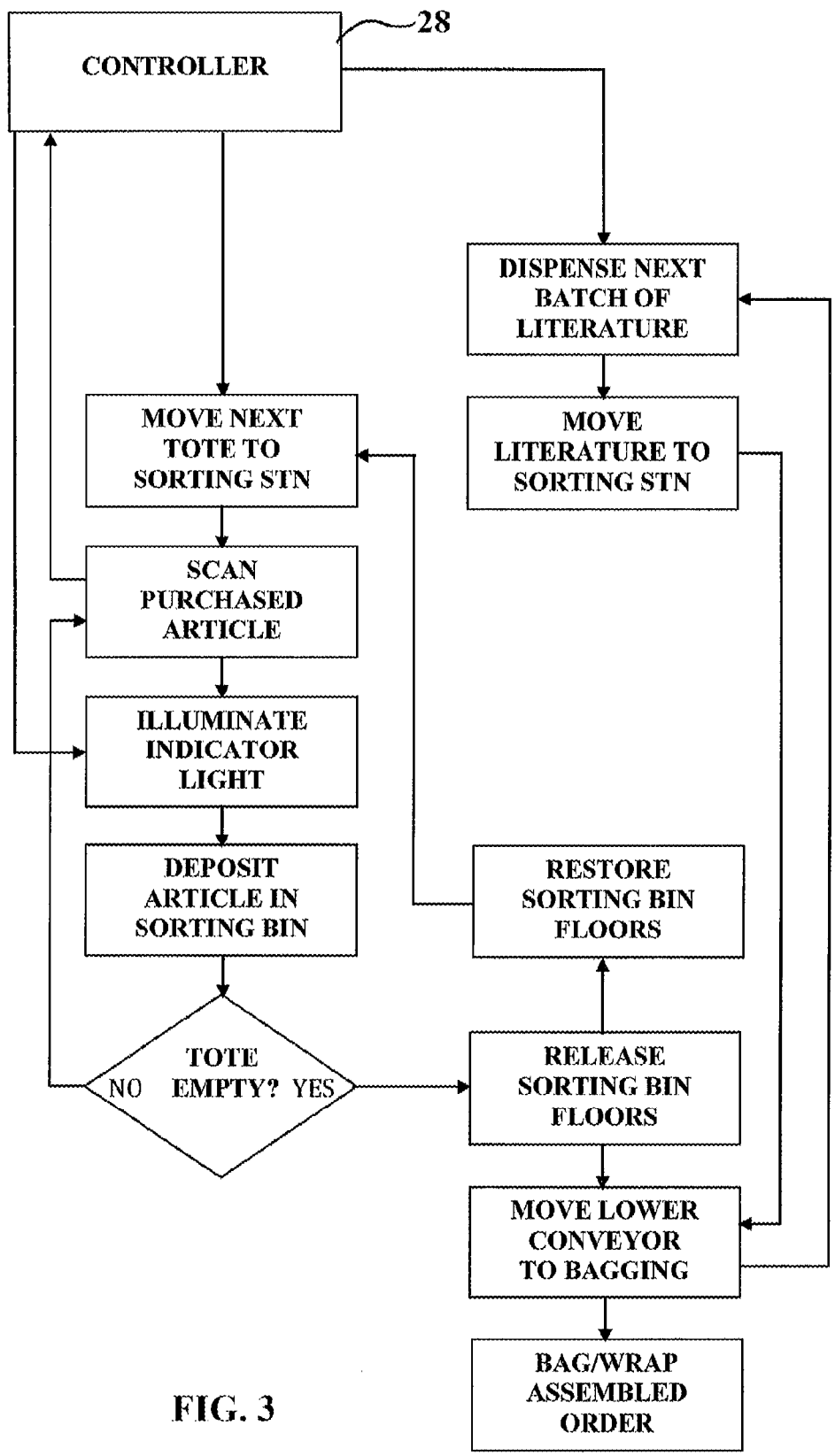
FIG. 3 is process workflow chart for the embodiment of FIG. 1.

A controller, for example a suitably programmed computer or other micro-processing device 28, is pre-loaded with data pertaining to each order being fulfilled, and pre-programmed with software and/or firmware for executing the system workflow illustrated in FIG. 3. The controller 28 receives signals from code-providing devices, and optionally operator signals; and provides control signals to the various dispensers 12, conveyors 14, 22, indicator lights 38 and sorting bins 32; in order to execute the system's automated processes as described herein. Other functions of the controller 28 will be apparent from the description below.

A plurality of stationary dispensable item dispensers 12 is provided for dispensing dispensable items 2 onto a dispensable items conveyor 14. The conveyor 14 preferably has dividers 14a sectioning off compartments 16 to contain each group of dispensed dispensable items 2. The dispensable item dispensers 12 are preferably disposed in a line adjacent to the dispensable items conveyor 14, each having a dispensing opening or chute (not shown) overhanging the dispensable items conveyor 14 so as to deposit dispensed items directly onto its respective compartment 16 of the conveyor 14. This configuration is beneficial because it reduces the footprint of the apparatus, however the dispensable item dispensers 12 may be disposed in other positions and provided with suitable means for conveying the dispensable items 2 into the respective compartments 16.

In the preferred embodiment a print feeder 18 prints a packing list and/or other on-demand collateral and deposits the packing list for a specific order onto the dispensable items conveyor 14 along with the associated dispensable items 2 for that order. Some embodiments may utilize only a print feeder 18, or only dispensable item dispensers 12, however in most applications both would be advantageously employed. The dispensable items conveyor 14 then conveys the dispensable items 2 to a lower level of a sorting station 30. As best seen in FIG. 2, the sorting station 30 comprises a plurality of stationary purchased item sorting bins 32 disposed along an upper level of the sorting station 30, into which purchased articles 4 for the various orders in the batch of orders being fulfilled are deposited by one or more operators 34.

A carton or tote 22 is moved to the sorting station 30 by a tote conveyor 24, preferably disposed above the level of the sorting bins 32 at a height within convenient reach of an operator 34. Each tote 22A, 22B, 22C . . . 22N contains a plurality of purchased articles that have been manually or automatically picked to fill multiple orders and deposited into the tote 22. For example (by way of example only and without limitation), each tote 22 may contain articles 4 purchased by five different purchasers, with on average four articles 4 per order, so the tote 22 contains a total of 20 articles 4 (each article having been pre-associated with a machine-readable code, for example a bar code) to be sorted, assembled with associated dispensable items 2 and packaged or bagged for delivery to the respective purchasers.

An operator 34 enters the product identifier of a purchased article 4, for example by scanning the purchased article 4, in the example illustrated using one of the bar code readers 26, however any suitable code-providing device may be used in the system of the invention, including without limitation a QR code reader or RFID sensor. In the embodiment illustrated the tote 22 conveyed to the sorting station 30, say tote 22A, has a bar code which is scanned as the tote 22A reaches the sorting station 30. Alternatively, when the first article 4 is picked from the tote 22A and scanned, the controller 28 matches the bar code data to data associated with the orders contained in the tote 22 being sorted. In either case the controller 28 recognizes that tote 22A is the tote 22 being sorted and assigns a specific sorting bin 32 to each of the five orders contained within the tote 22.

The controller 28 also assigns compartments 16 of the dispensable item conveyor 14 to each of the five orders contained within the tote 22A, each compartment 16 being associated with the particular sorting bin 32 that will be vertically aligned above the compartment 16 in the sorting station 30 when the orders are being assembled. As the compartment 16 passes each dispensable item dispenser 12, the controller actuates the dispensable item dispenser 12 to dispense a dispensable item 2 into the compartment 16 only if the dispensable item 2 is intended to accompany that specific order.

As each additional article 4 is picked from the tote 22A and scanned, the bar code reader 26 transmits a signal to the controller 28. From the received bar code the controller 28 identifies the scanned purchased article 4, and records that the scanned article 4 has been picked from the sorting bin 32 for sorting. The controller 28 determines from the scanned bar code which specific sorting bin 32 has been assigned to contain the order to which the scanned purchased article 4 relates, and illuminates the indicator light 38 associated with the assigned sorting bin 32. The operator 34 deposits the scanned purchased article 4 into the bin associated with the illuminated indicator light 38 and picks the next article 4 from the tote 22, repeating this process until all articles 4 contained in the tote 22 have been scanned. As the last article 4 in the tote 22 is picked and scanned, the controller 28 will recognize that all items in the multiple orders contained in the tote 22 have been deposited into the sorting bins 32. Alternatively, the operator 34 can manually depress an "order completed" button to invoke the next step in the process.

The sorting bins 32 are mounted on a rack or frame (not shown) in line with (and thus directly over top of) the dispensable items conveyor 14. The sorting bins 32 each have a releasable bottom, which when released allows the contents of the sorting bins 32 to drop onto the dispensable items conveyor 14, and specifically on top of the dispensable items 2 which had been deposited onto the dispensable items conveyor 14 and moved to the sorting station 30.

For example, the bottom 50 of each sorting bin 32 illustrated may comprise a pair of doors 52 hinged to the sorting bin body at each side. A release mechanism comprising a pneumatic actuator (not shown) or any other suitable release mechanism capable of applying a restoring force to close the doors 52 selectively releases the bottom 50 when the controller 28 recognizes that the multiple orders contained in the tote 22 have been sorted into the sorting bins 32, or an operator 34 depresses an "order completed" button. After a preset interval sufficient to allow the contents of the sorting bins 32 to drop onto the compartments 16 of the dispensable items conveyor 14 associated with each respective order, the pneumatic (or other) actuator restores the bottom 50 of each bin 32 for sorting of the next batch of orders contained in the next tote 22 on conveyor 24.

To complete the packaging of the order the combined package of purchased articles and custom-collated literature is conveyed by the dispensable items conveyor 14 to a semi-automated or fully automated bagging system 20, and packaged, bagged or otherwise enclosed in a parcel for delivery.

The controller 28 also preferably coordinates shipping data with the packaged dispensable items 2 and purchased articles 4 moving along the dispensable items conveyor 14, and signals a printer (not shown) to print a shipping label on the parcel or bag (or separately, if desired, for attachment to the parcel or bag by the bagger) as the operator deposits products into the parcel or bag, which is then ready sealed for shipping.

Additional sorting bins 32' may optionally be provided as a buffer, in case one or more of the operators falls behind in the article picking and scanning process. This also allows the totes 22 to contain varying numbers of orders.

It will be appreciated that the conveyors described and illustrated, including (without limitation) the dispensable items conveyor 14, may each comprise multiple physical conveyors, for example (without limitation) conveyor belts as shown, disposed in series.

Figure 4:
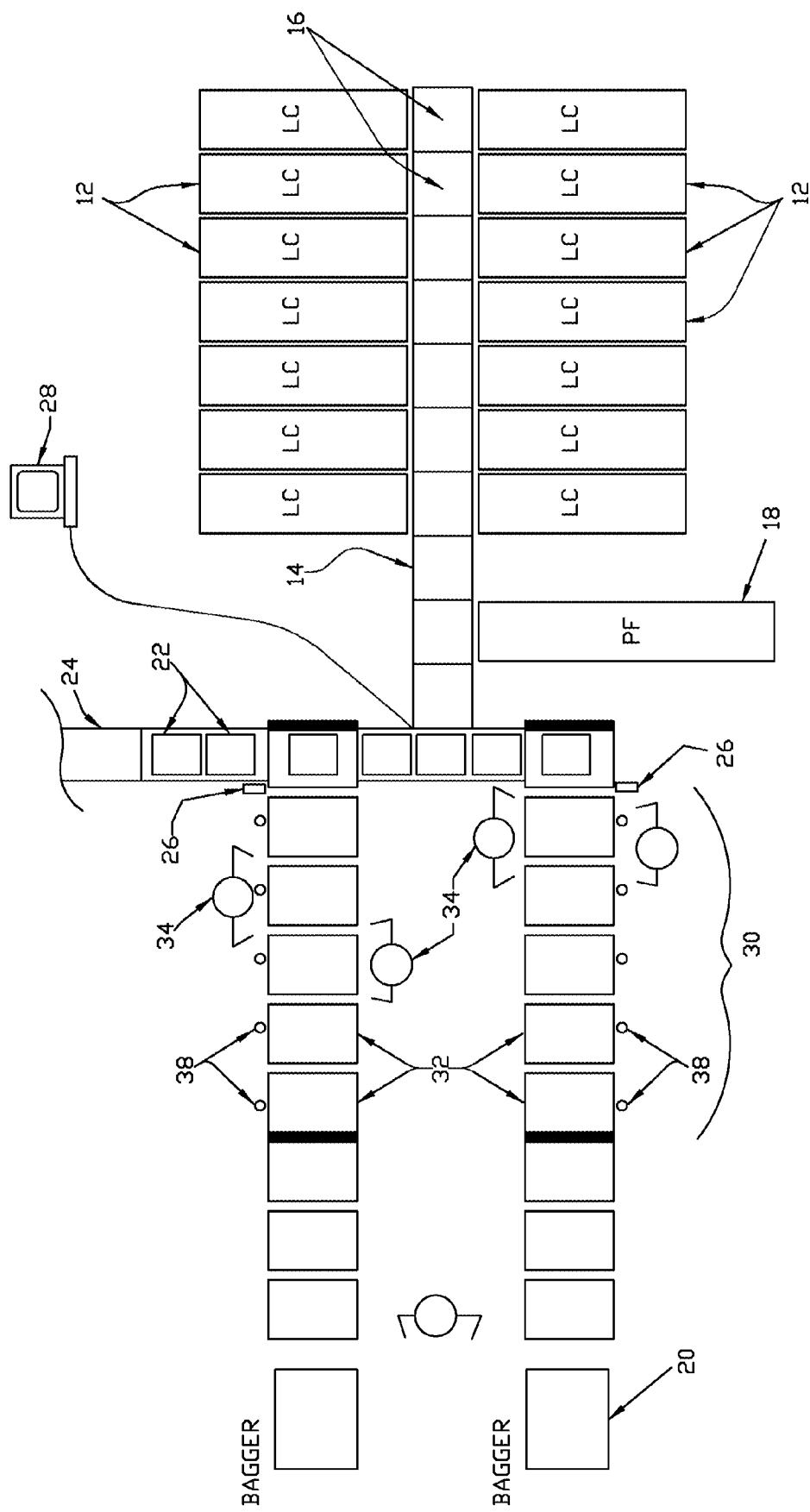
FIG. 4 is a schematic plan view of a further embodiment of an order fulfilment system according to the invention.

FIG. 4 illustrates an embodiment of the invention providing two sets of dispensable article dispensers 12, one on either side of the dispensable items conveyor 14, and two sets of sorting bins 32. In this embodiment six primary sorting bins 32 are provided for sorting six orders of purchased articles at a time. The operation of this embodiment is otherwise substantially the same as the previous embodiment, but throughput is essentially doubled.

Figure 5:
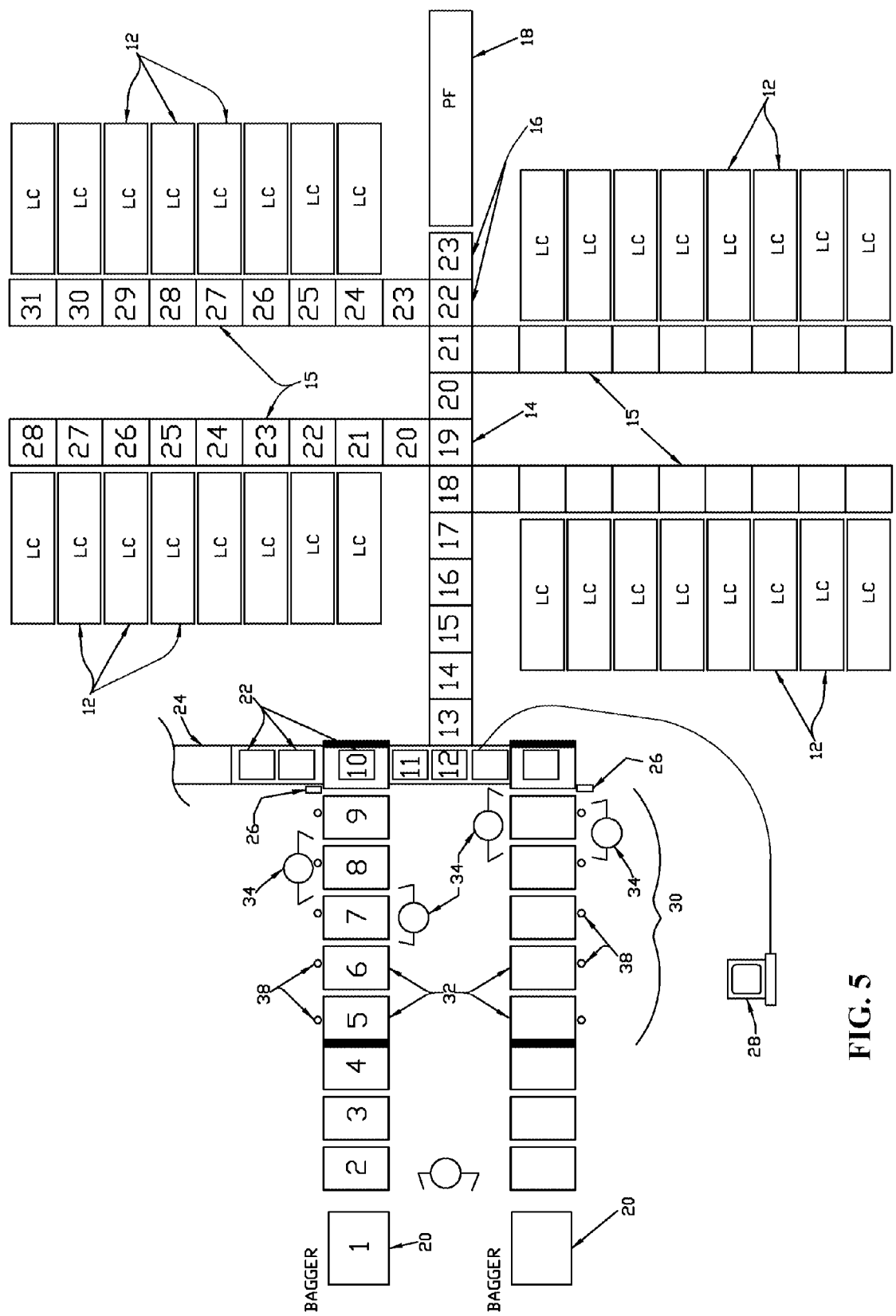
FIG. 5 is a schematic plan view of a further embodiment of an order fulfilment system according to the invention.

FIG. 5 illustrates an embodiment of the invention providing four sets of dispensable article dispensers 12, each disposed along an auxiliary conveyor 15 feeding into the dispensable items conveyor 14. The throughput in this embodiment is similar to that of the embodiment of FIG. 4, however the increased number of dispensable article dispensers 12 allows for a greater variety of dispensable items 2 to be included with the purchased articles 4.

In the preferred embodiments the bottoms 50 of the bins 32 are releasable, to physically drop the contents onto the dispensable items conveyor 14, as described above. However, as an alternative, once the dispensable items conveyor 14 is vertically aligned with the sorting bins 32 one or more operators can manually sort the purchased items directly onto the dispensable item conveyor 14 at the sorting area 30 instead of using the pneumatic drops as earlier described. This makes the system longer by requiring an additional buffer conveyor to pre-stage the product in order to maintain throughput rate, however the end result is the same.

It will be appreciated that some or all of the functions described herein as being performed by an operator may be automated without affecting the operation of the invention. Various embodiments of the present invention having been thus described in detail by way of example, it will be apparent to those skilled in the art that variations and modifications may be made without departing from the invention. The invention includes all such variations and modifications as fall within the scope of the appended claims.

The invention claimed is:

1. An order sorting system for sorting and assembling a batch of purchaser orders, comprising
   a plurality of stationary item dispensers for dispensing a plurality of items, each dispensed item comprising a physical item generated at the order sorting system for a corresponding purchaser order of the batch of purchaser orders, each purchaser order corresponding to at least one dispensed item of the plurality of dispensed items;
   at least one first conveyor for receiving the plurality of dispensed items and conveying the plurality of dispensed items to a lower level of a sorting station,
   a plurality of stationary sorting bins disposed along an upper level of the sorting station in line with the at least one first conveyor,
   a second conveyor for conveying a plurality of purchased articles to the upper level of the sorting station, each purchased article being previously associated with a machine-readable code representing a product identifier for the purchased article;
   a controller for:
      identifying, using the machine-readable code of each purchased article, a stationary sorting bin of the plurality of stationary sorting bins to place each purchased article to fill a respective purchaser order of the batch of purchaser orders, and
      positioning the at least one dispensed item associated with each respective purchaser order on the at least one first conveyor in generally vertical alignment with the stationary sorting bin associated with the purchaser order,
   whereby the purchased articles are moved onto the at least one first conveyor in physical proximity of any dispensed items associated with each purchaser order for packaging the purchased articles and the dispensed items together to deliver to each respective purchaser.

2. The order sorting system of claim 1 wherein the stationary sorting bins each comprise a releasable bottom for dropping contents of the stationary sorting bins onto the first conveyor,
whereby the purchased articles are dropped onto the first conveyor in physical proximity of any dispensed items associated with each purchaser order.

3. The order sorting system of claim 2 wherein the controller releases the releasable bottoms of the sorting bins when all purchased articles in the batch of purchaser orders have been placed into the stationary sorting bins.

4. The order sorting system of claim 1 comprising a plurality of first conveyors conveying dispensed items to the sorting station.

5. The order sorting system of claim 1 wherein at least some of the dispensed items comprise documents printed on demand, and the plurality of stationary item dispensers comprise at least one print feeder providing the documents.

6. The sorting system of claim 1 wherein the purchased articles are manually moved onto the first conveyor.

7. A method of assembling a batch of purchaser orders in an order fulfillment system, the method comprising:
dispensing, by a plurality of stationary item dispensers, groups of one or more items on a first conveyor, each group of one or more dispensed items being dispensed on the first conveyor in a position associated with a distinct purchaser order of the batch of purchaser orders, each dispensed item comprising a collateral item generated at the order fulfillment system;
conveying, using the first conveyor, the groups of one or more dispensed items to positions below a group of stationary sorting bins, each stationary sorting bin being associated with a distinct purchaser order of the batch of purchaser orders and comprising a group of one or more purchased articles associated with the distinct purchaser order, to thereby position each group of one or more dispensed items in generally vertical alignment with the corresponding stationary sorting bin associated with the same distinct purchaser order; and
moving the groups of one or more purchased articles onto the first conveyor in physical proximity of the group of one or more dispensed items corresponding to the same distinct purchaser order.

8. The method of claim 7 wherein the stationary sorting bins each comprise a releasable bottom, and moving the groups of one or more purchased articles comprises releasing the bottom of each stationary sorting bin to drop the group of one or more purchased articles comprised in the stationary sorting bin onto the first conveyor.

9. The method of claim 7 further comprising:
conveying a plurality of purchased articles to the group of stationary sorting bins;
associating each purchased article of the plurality of purchased articles with a distinct purchaser order of the batch of purchaser orders; and
receiving each purchased article in the stationary sorting bin associated with the distinct purchaser order associated with the purchased article.

10. The method of claim 7 wherein each collateral item comprises a document printed on demand at the order fulfillment system.

11. The method of claim 10 wherein at least one stationary item dispenser comprises a print feeder.

12. The method of claim 9, wherein the plurality of purchased articles are conveyed using a second conveyor.

13. The method of claim 9, wherein associating each purchased article of the plurality of purchased articles comprises reading a machine-readable code provided on the purchased article and correlating the machine-readable code to the associated distinct purchase order.

14. An order fulfillment system comprising:
a sorting station comprising a plurality of stationary sorting bins for receiving corresponding groups of one or more purchased articles, each group of one or more purchased articles corresponding to a purchaser order of a plurality of purchaser orders;
a plurality of stationary item dispensers, each stationary item dispenser being configured to dispense a group of one or more items on a first conveyor, each group of one or more dispensed items corresponding to a purchaser order of the plurality of purchaser orders, each dispensed item comprising a collateral item generated at the order fulfillment system for its corresponding purchaser order;
the first conveyor configured to receive the groups of one or more dispensed items from the plurality of stationary item dispensers and convey the groups of one or more dispensed items to the sorting station proximate to the plurality of stationary sorting bins;
a control configured to:
define an arrangement of the groups of one or more dispensed items as dispensed by the plurality of stationary item dispensers on the first conveyor such that each group of one or more dispensed items is in substantially vertical alignment with the stationary sorting bin corresponding to the same corresponding purchaser order when conveyed by the first conveyor to the sorting station.

15. The order fulfillment system of claim 14, wherein the controller is further configured to identify, for each purchased article of a plurality of purchased articles received at the sorting station, a corresponding purchaser order of the plurality of purchaser orders, and identify a corresponding stationary sorting bin for the corresponding purchaser order.

16. The order fulfillment system of claim 15, wherein the controller is configured to identify the corresponding purchaser order for each purchased article from a scanned machine-readable code associated with each purchased article.

17. The order fulfillment system of claim 14, wherein the first conveyor is positioned vertically below the plurality of stationary sorting bins, and further wherein each stationary sorting bin is provided with a releasable bottom to release the groups of purchased articles received in the stationary sorting bins onto the first conveyor proximate the groups of one or more dispensed items corresponding to the same corresponding purchaser order.

18. The order fulfillment system of claim 17 wherein the first conveyor further conveys the groups of purchased articles and groups of one or more dispensed items to a bagging or packaging system.

19. The order fulfillment system of claim 14, further comprising a second conveyor configured to convey a plurality of purchased articles to the sorting station.

20. The order fulfillment system of claim 14, wherein the collateral items generated on-demand comprise printed material, and at least one of the stationary item dispenser comprises a print feeder.

* * * * *